United States Patent
Bahr

(10) Patent No.: US 6,439,086 B1
(45) Date of Patent: Aug. 27, 2002

(54) TORQUE LIMITING DEVICE

(76) Inventor: Randall A. Bahr, 4550-3 Saint Augustine Rd., Jacksonville, FL (US) 32207

( * ) Notice: Subject to any disclaimer, the term of this patent is extended or adjusted under 35 U.S.C. 154(b) by 542 days.

(21) Appl. No.: 08/931,932

(22) Filed: Sep. 17, 1997

Related U.S. Application Data

(60) Provisional application No. 60/026,228, filed on Sep. 17, 1996.

(51) Int. Cl.[7] .............................................. B25B 23/14
(52) U.S. Cl. .............................. 81/467; 81/473; 81/477; 81/480
(58) Field of Search .......................... 81/467, 473, 476, 81/477, 478, 480, 58, 58.4, 58.5

(56) References Cited

U.S. PATENT DOCUMENTS

| | | | | |
|---|---|---|---|---|
| 2,332,972 A | * | 10/1943 | Johnson | 81/480 |
| 2,400,205 A | * | 5/1946 | Livermont | 81/477 |
| 2,972,271 A | * | 2/1961 | Gill | 81/480 |
| 3,425,314 A | * | 2/1969 | Ohlson | 81/447 X |

* cited by examiner

Primary Examiner—D. S. Meislin
(74) Attorney, Agent, or Firm—Nixon & Vanderhye P.C.

(57) ABSTRACT

A torque limited applicator is useful for a wide variety of purposes where a mechanical device, such as a fastener, is to be driven but a maximum level of torque not exceeded. The applicator is reusable, and preferably easily constructed from integral pieces of plastic. A torque applying element with internal cam followers and a fastener drive structure with a drive element and a cam element may either be removably positioned with respect to each other, or a retaining ring and deformable pin may attach them together. A plug may be provided to reduce the possibility of tampering, provide a tamper evident seal, and to prevent foreign material from entering the area of cooperation between the cam element and cam followers, as well as providing an area for indicia indicating the maximum level of preset torque. Color coding for different torque levels for the applicators may be provided.

17 Claims, 4 Drawing Sheets

TORQUE LIMITING DEVICE

CROSS REFERENCE TO RELATED APPLICATION

This application is based upon and claims priority of provisional application No. 60/026,228 filed Sep. 17, 1996.

BACKGROUND AND SUMMARY OF THE INVENTION

In many industries such as medical, electronic assembly, tool, and fixturing industries, there are circumstances when a limited amount of torque should be applied to mechanical devices, such as fasteners. As one example when using bone penetrating pins especially for attachment of halos or like mechanical appliances, it is necessary to limit the amount of torque applied to the fastener (such as described generally in U.S. Pat. No. 4,838,264, the disclosure of which is hereby incorporated by reference herein). It is desirable to be able to provide such torque limited applicators at low cost, and in some industries—such as the medical industry—low enough cost so that they are disposable. Sometimes single use breakaway types of torque limited applicators are used, but in some situations it is desirable to be able to have a reusable torque limited applicator, e.g. one that can at least be used with a plurality of fasteners, the number of fasteners being suitable to at least perform a particular procedure.

The torque limited applicator according to the present invention is simple and easy to construct, having a minimum number of components, wide diversity in component configurations that allows great flexibility depending upon the particular industry and particular mechanical devices (such as fasteners) to be utilized therewith, and being constructable of a wide variety of materials. Typically the torque limited applicator includes at least a torque applying element and a fastener drive structure, one of the components having cam followers and the other a cam element which cooperates with each other so that the torque applying element drives the fastener drive structure until a predetermined torque is reached, at which point there is relative rotational movement between the cam followers and the cam element. The cam element can have any number of "lobes" and any suitable configuration, and two or more cam followers may be provided. Both components may be formed of an integral piece of plastic, e.g. by injection molding, or by milling, turning, or other machining.

In most circumstances it would be desirable to have the torque applying element and the fastener drive structure connected together so that they do not separate during normal use. This may be provided by using a retaining ring which cooperates with a deformable pin of the fastener drive structure. Also a plug may be utilized to prevent tampering with the internal components, to provide a tamper evident seal, and to prevent the entry of foreign material into the operative area between the cam element and cam followers, as well as to provide an area for the placement of indicia (such as the amount of torque that such an applicator may apply). The plug and retainer ring also can each be an integral piece of plastic.

According to one aspect of the present invention a torque limited applicator is provided comprising the following components: A torque applying element having a tubular body and a handle, the tubular body comprising at least two internal cam followers. A fastener drive structure having first and second ends, and comprising a drive element adjacent the first end, and a cam element adjacent the second end. And, the cam followers and the cam element engaging and cooperating with each other so that upon application of a force to the handle up to a predetermined maximum torque the cam followers engage the cam element to transmit rotational force from the handle to the drive element, and upon the predetermined maximum torque being exceeded the cam followers being deformed and moved past the cam element so that a torque greater than the predetermined maximum cannot be applied to the drive element by the torque applying element.

The cam element may comprise a cylindrical element having a cross-section in the shape of a pointed end ellipse, or may have a wide variety of other dual or multi-lobed configurations.

In one embodiment the tubular body of the torque applicator has an interior surface; and wherein the cam followers comprise at least two oppositely disposed first and second arms of bendable material and each having a contoured surface free end extending outwardly from the interior surface and engaging the cam element; and wherein there is sufficient clearance within the tubular body of the torque applying element between the cam element and the contoured surface free ends so that the free ends may move between the cam element and the tubular body interior along substantially 360E.

The torque applying element and fastener drive structure may each be one integral piece of plastic, and a retaining ring may be provided for connecting the torque applying element and fastener drive structure together so that they are connected during normal use. That is the torque limited applicator cam followers may each comprise a top surface, and further comprise a retaining ring having a central opening therein, the retaining ring having a bottom surface in engagement with the top surface; and the fastener drive structure may include a pin integral therewith and extending upwardly therefrom, the pin having cross-sectional dimensions less than the cross-sectional dimensions of the ring opening, and having a length greater than the thickness of the ring so that a portion of the pin extends above the ring, the portion of the pin above the ring deformed into contact with the top surface of the ring to hold the ring in place.

There also may be bearing surfaces between the torque applying element and the fastener drive structure to facilitate relative rotation therebetween.

The torque limited applicator may also comprise a plug that plugs the torque applying element tubular body at the handle. The plug may have indicia thereon, visible from the exterior of the torque applying element, indicating the predetermined maximum torque that can be applied by the torque applying element. The plug and the retaining ring may also each be one integral piece of plastic, and all of the components can be made of the same plastic, although they can be made of different plastics too (e.g. such as the torque applying element of acetal and the fastener drive structure of polytetrafluoroethylene). Suitable plastics that may be used for the components include acetal (e.g. DELRIN7 500 from DuPont), PBT, PET, polytetrafluoroethylene, polyamide, polycarbonate, polysulfone, PEEK, PEKEKK, and polyetherimide.

At least three torque limited applicators may be utilized, each of the applicators having a different maximum torque and of a different color. All of the components can be of a different color from one torque level to the next, or just the plugs within any given torque level may be of the same color.

The invention also relates to a method of securing a fastener in place, which fastener should be subjected to only a predetermined amount of torque, comprising the steps of (a) selecting an appropriate torque level limited applicator such as described above; (b) bringing the drive element associated with the torque limited applicator into operative contact with a fastener; (c) rotating the torque applying element to drive the fastener drive structure until the desired torque level has been reached as indicated by a tactile or audible indication once the cam followers have moved past the cam element; (d) removing the torque limited applicator from the fastener; and (e) repeating steps (a) through (d) for a second fastener using the same torque limited applicator.

It is the primary object of the present invention to provide a low cost reusable torque limiting device and method of utilization thereof. This and other objects of the invention will become clear from an inspection of the detailed description of the invention and from the appended claims.

DETAILED DESCRIPTION OF THE DRAWINGS

Figure 1:
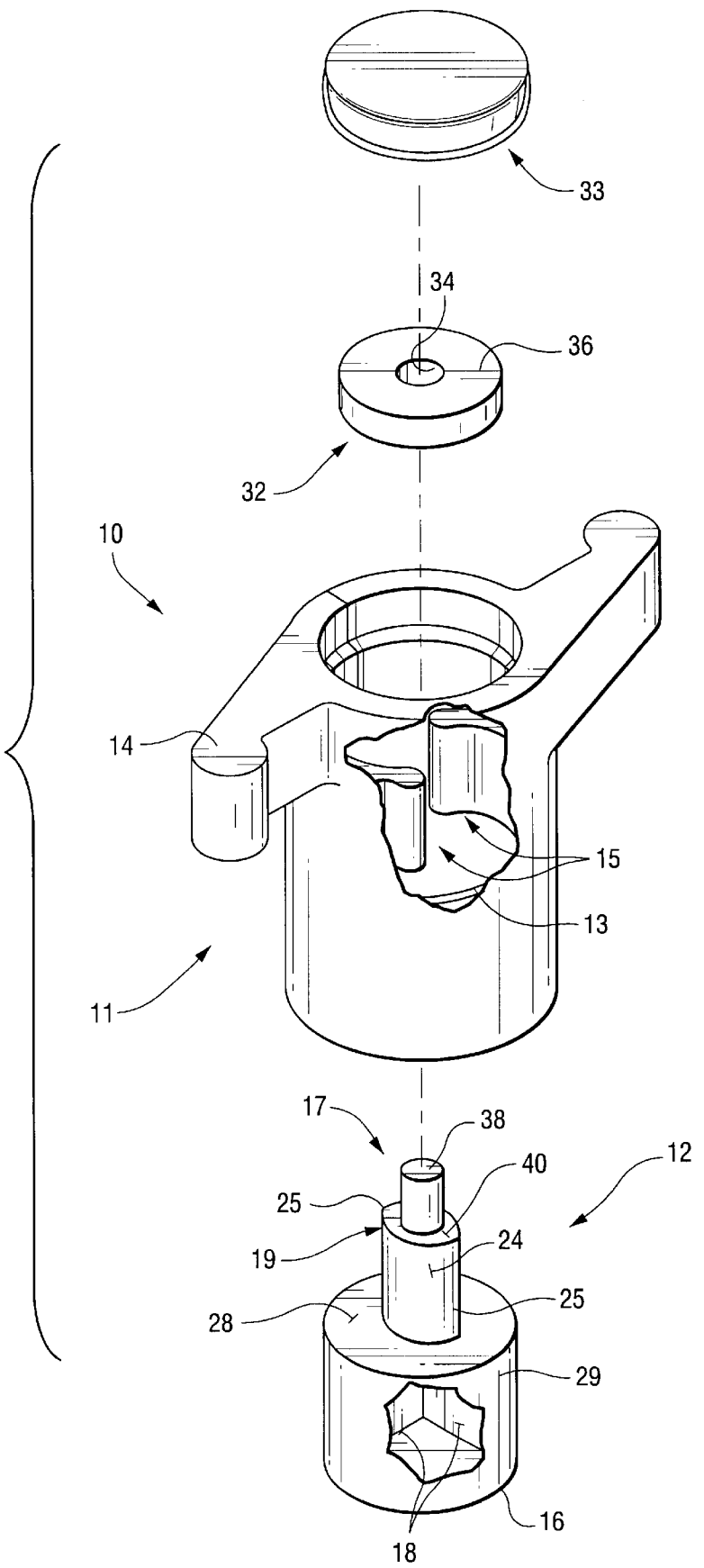
FIG. 1 is an exploded isometric view of one embodiment of an exemplary torque limited applicator according to the present invention.

One embodiment of a torque limited applicator according to the present invention is shown generally by reference numeral 10 in FIGS. 1 through 6. The two major components of the applicator 10 are the torque applying element, shown generally by reference numeral 11, and the fastener drive structure 12. One of the elements 11, 12 will have cam followers while the other will have a cam element typically with two or multiple lobes. In the preferred embodiment illustrated in the drawings, the torque applying element 11 comprises a tubular body 13 and a handle 14, the tubular body 13 having at least two internal cam followers 15. In the preferred embodiment illustrated in the drawings the fastener drive structure 12 has a first end 16 and a second end 17. A drive element 18 is provided adjacent the first end 16, and a cam element 19 adjacent the second end 17.

The drive element 16 is for driving the head 20 of a fastener 21 (see FIG. 2), or like mechanical device. The drive element 16 may—as illustrated in the exemplary embodiment of FIGS. 1 and 2—comprise a square-shaped (or other polygonal configuration) opening which is slightly larger in cross-sectional area than the head 20 of the fastener with which it is to cooperate. However instead of comprising an opening, the drive element 16 may comprise a male element, or it may include a male element inside of an opening. Almost any type of conventional drive/fastener configuration may be utilized, such as straight slot, philips, TOKX®, hex key, and Shear-LOC® drive/fastener systems. Also the fastener 21 may comprise any suitable fastener for use in medical, electronic assembly, tool, fixturing, or other industries. For example it may comprise a wide variety of different types of screw fasteners, skull pins such as used in orthopedic and stereotactic devices, or other bone penetrating pins (e.g. such as described in U.S. Pat. No. 4,838,264), or the like. The fasteners 21 will often be made of metal, but can be made of plastic, or even wood or other suitable materials.

Figures 3, 4:
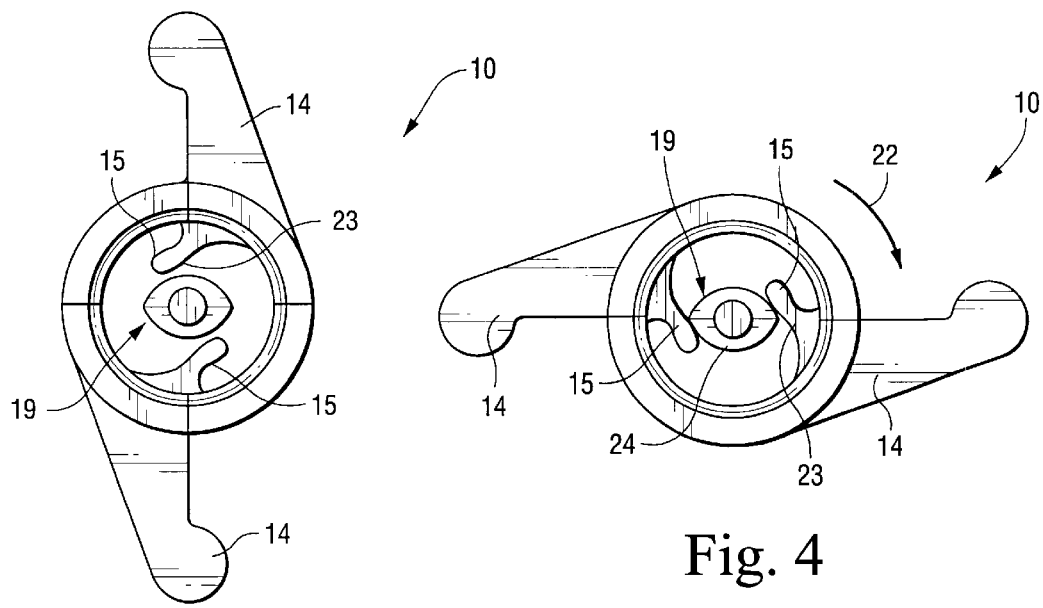
FIGS. 3 through 6 are schematic top views, with the plug and retainer ring removed for clarity of illustration, showing the cooperation between the cam element and cam followers of the applicator of FIGS. 1 and 2 during different stages of use thereof.
Figures 5, 6:
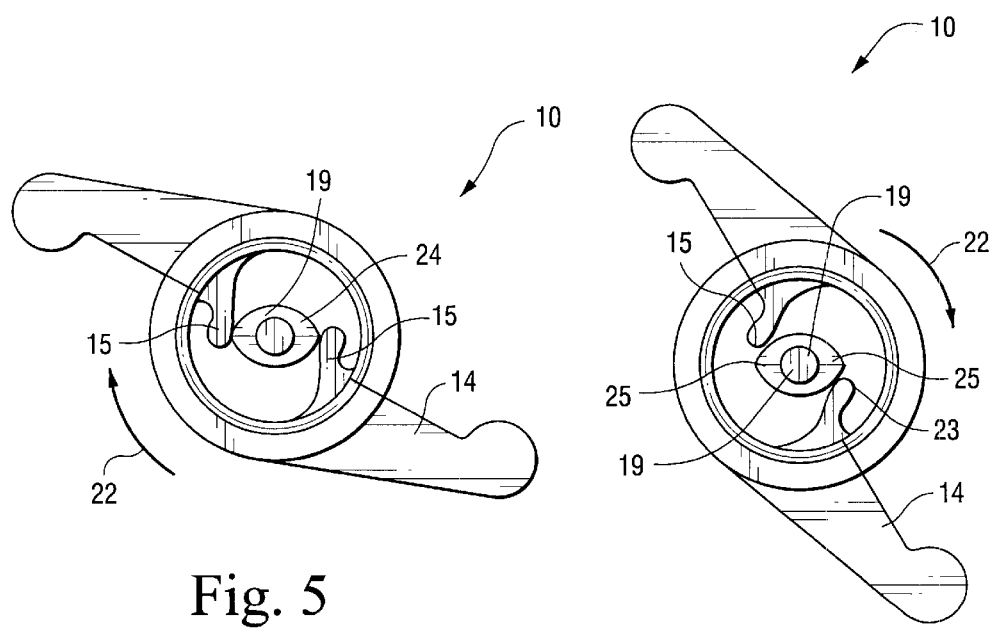

The cam followers 15 and the cam element 19 engage and cooperate with each other so that upon application of a force to the handle 14 up to a predetermined maximum torque the cam followers 15 engage the cam element 19 to transmit rotational force from the handle 14 to the drive element 16. FIG. 3 shows the cooperation between the cam followers 15 and cam element 19 when the applicator 10 is "at rest". FIG. 4 illustrates the relative engagement of the components 15, 19 as the handle 14 is rotated in the direction 22, rotation of the handle 14 resulting in comparable rotation of the cam element 19 (and the rest of the fastener drive structure 12 to which it is connected or an integral part). FIG. 5 shows the relative relationship between the components 19, 15 when the fastener 21 is binding, and the predetermined torque level for the applicator 10 is being reached, the cam followers 15 being deformed. FIG. 6 shows the position between the components 15, 19 once the predetermined maximum torque has been exceeded, the cam followers 15 having been deformed sufficiently so that they have moved past the cam element 19. In this way a torque greater than the predetermined maximum cannot be applied to the drive element 16 by the torque applying element 11.

The cam followers 15 and the cam element 19 may have a wide variety of configurations. In the embodiment illustrated in FIGS. 1 through 6 two approximately 180° spaced cam followers 15 are provided each having a gently curved surface 23 (see FIGS. 3, 4, and 6) which engages the outer periphery 24 of the cam element 19. However three, four, or even more cam followers 15 may be provided, or even a single cam follower if appropriate balance of the applicable forces can be provided.

In the preferred embodiment illustrated in FIGS. 1 through 6, the cam element 19 comprises a cylindrical element with a cross-section in the shape of a pointed end ellipse (e.g. approximately almond shaped). The pointed ends of the ellipse—seen at 25 in FIGS. 1 and 6—may be considered lobes. Normally the same number of lobes (e.g. pointed ends 25) will be provided for the cam element 19 as there are cam followers 15, but there could be more cam followers than lobes, or more lobes than cam followers, in certain constructions.

Figure 7:
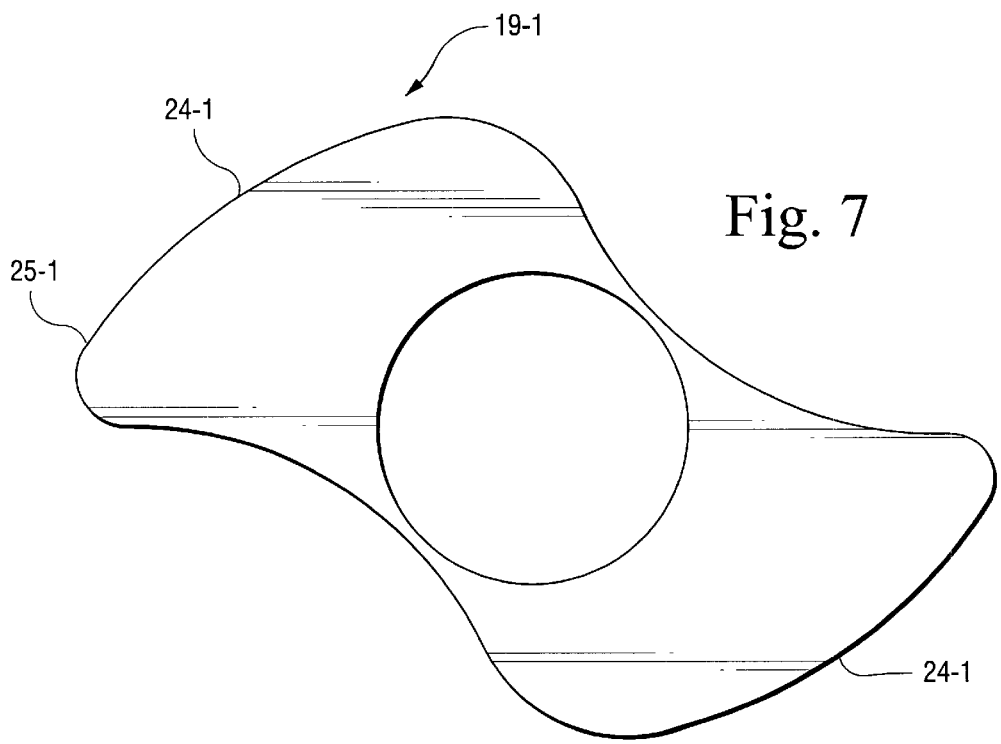
FIGS. 7 and 8 are top plan views of two exemplary alternative configurations the cam element of the applicator according to the invention may assume.
Figure 8:
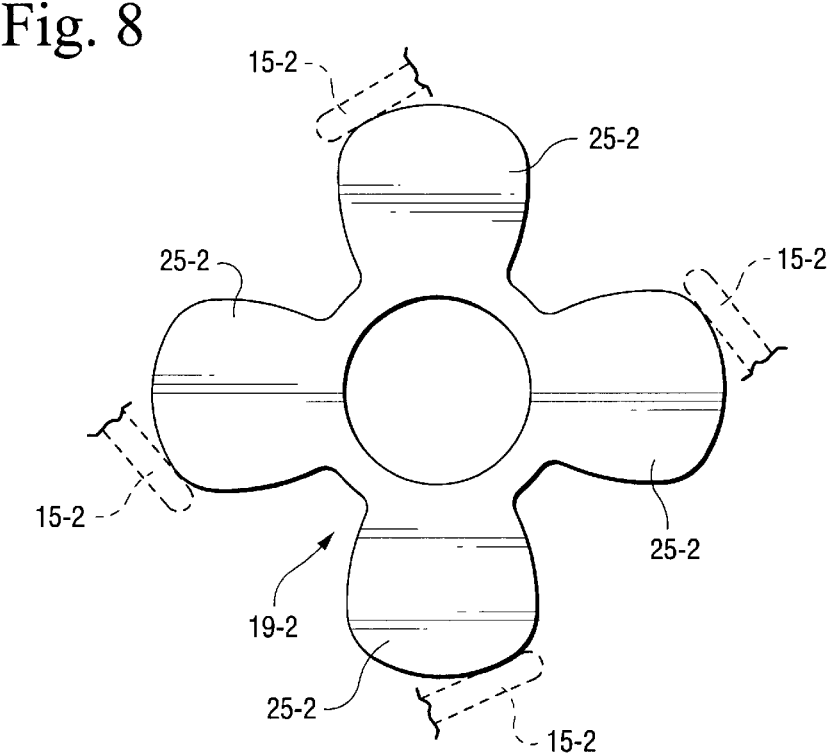

While a wide variety of different other shapes and configurations of the cam element, including toothed gear, star, or clover constructions, may be provided, two exemplary embodiments of different types of cam elements are illustrated in FIGS. 7 and 8. The cam element 19-1 includes two lobes 25-1 and a specially contoured external surfaces 24-1 for cooperating with cam followers, such as the cam followers 15 of FIGS. 1 through 6. FIG. 8 shows a cam element 19-2 with four lobes 25-2, in this case in the approximate configuration of a four leaf clover. In this embodiment four cam followers 15-2 are illustrated, one cooperating with each lobe 25-2.

Figure 2:
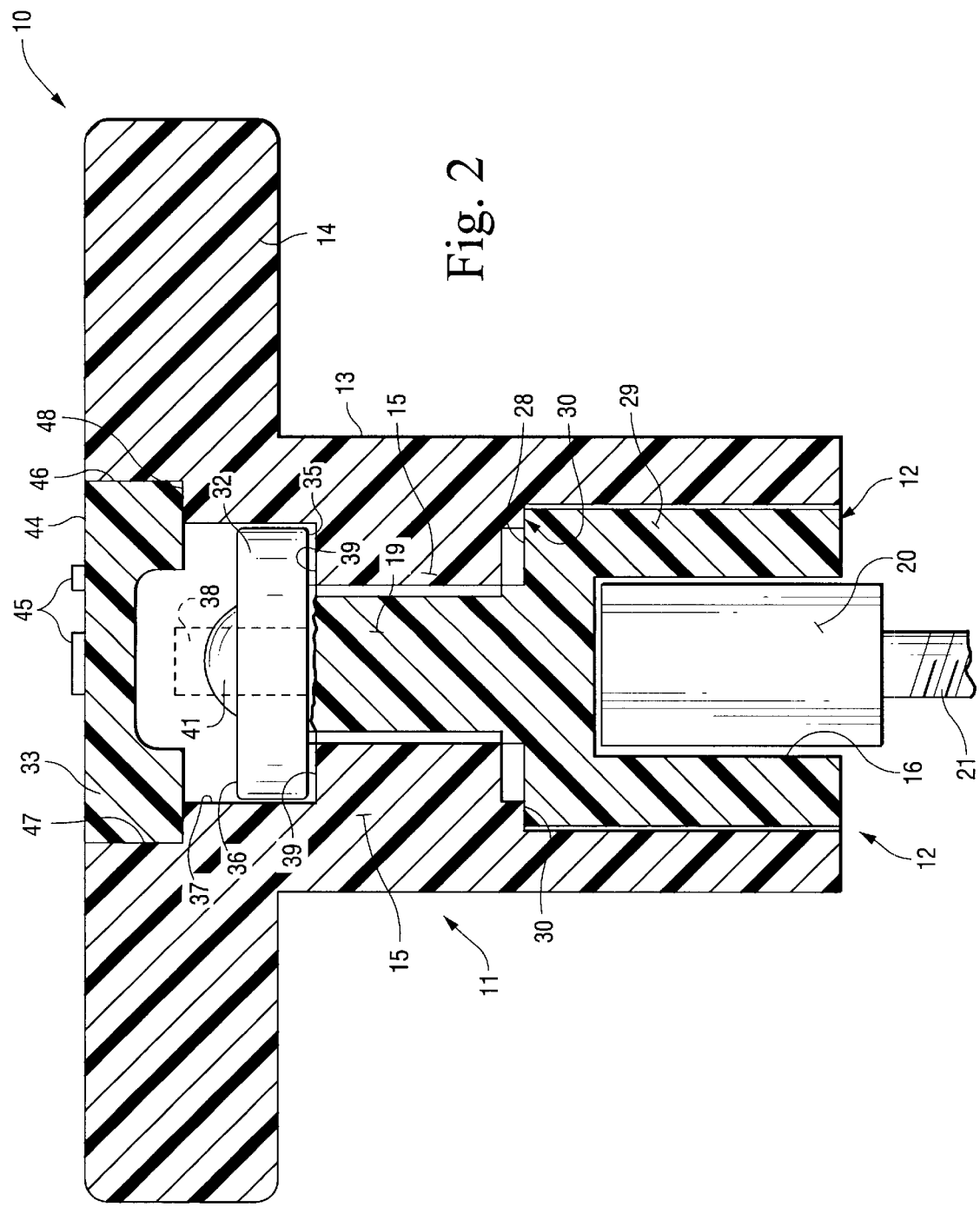
FIG. 2 is a side view, primarily in cross-section but partly in elevation, of the applicator of FIG. 1 shown in operative association with a fastener head.

In the normal utilization of the applicator 10 the components 11, 12 fit together as illustrated in FIG. 2. That is a top shoulder 28 of the generally cylindrical (although perhaps tubular) body 29 containing the drive element 16 fits inside the tubular body 13 of the element 11. The interior of the tubular body 13 preferably has an annular bearing surface 30 (see FIG. 2) which cooperates with the surface 28 to provide relative ease of rotation between the elements 11, 12. A low friction coating may be provided at the area of cooperation between the elements 28, 30 or one or both of those, surfaces may be made of inherently low friction material such as polytetrafluoroethylene. Other bearing surfaces (such as the circumferential periphery of the body 29 and the corresponding internal tubular cavity of the body 13) may also be provided, but are typically unnecessary. The engagement between the surfaces 28, 30 also prevents movement of the element 11 too far downwardly with respect to the element 12, and properly vertically aligns the cam followers 15 and cam element 19, as seen in FIG. 2.

While the elements 11, 12 are the only elements absolutely required to perform the torque limiting function of the applicator 10 according to the invention, preferably other elements are also provided. Particularly, it is desirable to provide a retaining ring 32 and a plug 33, both of which are visible in FIGS. 1 and 2, but have been removed from FIGS. 3 through 5 for clarity of illustration.

The retaining ring 32 is a structure that prevents the element 12 from slipping out of the element 11, so that the elements 11, 12—while relative rotation between them is allowed—can be easily transported together and moved from fastener head 20 to fastener head 20. The retaining ring 32 has an internal central bore 34 (see FIG. 1), a bottom surface 35 (see FIG. 2), and a top surface 36 (FIGS. 1 and 2). It has an outside diameter just slightly less than the internal diameter of the tubular bore 37 at the handle part 14 of the element 11 (see FIG. 2), and the internal bore 34 cooperates with the cylindrical pin 38 extending upwardly from the cam element 19 (see FIG. 1). The pin 38 has a length such that it extends past the top surface 36 of the ring 32 (see the dotted line configuration in FIG. 2) when the ring bottom surface 35 engages the top surface 39 of the lobes 15 and/or the top surface 40 of the cam 19. The retaining ring 32 is held in place by deforming the pin 38 to form the head 41 as illustrated in FIG. 2, the head 41 preventing the ring 32 from moving upwardly through the bore 37, and the cam follower 15 surfaces 39 preventing the ring 32 from moving downwardly out the bottom of the tubular element 11.

The plug 33, when utilized, is provided to perform a number of functions. It reduces the possibility of tampering with the internal operative components (15, 19) or access for easy removal of the ring 32, as well as providing a tamper evident seal. Also it prevents foreign material from entering the volume adjacent the cam followers 15 and cam element 19, which foreign material could interfere with operation or change the maximum torque level. Also on the top surface 44 of the plug 33 is a suitable area for providing indicia, such as the name or logo of the applicator 10 manufacturer and/or a maximum torque level for that particular applicator 10, the indicia being seen schematically at 45 in FIG. 2. While the plug 33 may be mounted with the rest of the components of the applicator 10 in any desired manner, in the embodiment illustrated in FIGS. 1 and 2, the circumferential periphery 46 of the plug 33 makes an interference fit with the internal periphery 47 of the tubular bore of the element 11, and an annular shoulder 48 of the handle 14 precludes downward movement of the plug 33 in the element 11 past the level of the shoulder 48. If desired an ultrasonic weld, adhesive, screw thread engagement, or other fastening mechanism may be used instead of or in addition to the interference fit between the surfaces 46, 47.

Preferably all of the individual components 11, 12, 32, and 33 of the applicator 10 according to the invention are each made of an integral piece of plastic. For example they may be injection molded in integral form, or they may be machined (e.g. milling, turning, stereo-lithography, etc.) from a block of plastic. A wide variety of different types of plastic may be utilized. Three of the most desirable plastics are acetal (e.g. DELRIN7 500, from DuPont), polyamide, and polytetrafluoroethylene. All of the elements 11, 12, 32, 33 may be made of the same plastic to make applicator 10 easy to recycle, or they may be made of different plastics depending upon the relative properties of the plastics. For example the element 11 may be made of acetal or polyamide (nylon) while element 12 (including cam element 19) is made from polytetrafluoroethylene. Other plastics that may be suitable are PBT, PET, polycarbonate, polysulfone, PEEK, PEKEKK, and polyetherimide. Physical characteristics that will control the functionality of the applicator 10, and the suitable plastic, include elongation, flexural strength, and flexural modulus.

A wide variety of different applicators 10 may be manufactured, each having a different maximum torque that can be applied thereby. For most purposes the minimum torque to be applied by the applicator 10 would be on the order of about one inch ounce, while at the maximum end the torque could be essentially as high as a human hand or fingers could exert on the handle 14. For a handle 14 having a cross-dimension (from one end of one portion of the handle 14 to the other end of the other portion of the handle 14) of 1.5 inches, the maximum torque level for a device 10 would be on the order of 40–50 inch pounds. Different torque levels of the applicators 10 may be indicated by different colors either of the element 11 (or even all of the components 11, 12, 32, 33), or just the color of the plug 33 itself. Typically there would be at least three different applicators 10 having different colors (e.g. blue, red, yellow, orange, white, black, etc.) depending upon the maximum torque that could be applied therewith. This color coding would allow the user to immediately know if he or she were using the correct applicator 10 for a particular situation, and would facilitate the utilization of the applicator 10 in general.

When the element 12 is made of plastic, formation of the head 41 may be accomplished utilizing a heated tool with a small concave radius.

That heated tool could then deform the portion of the pin 38 extending above the ring 32 to form the head 41 as illustrated in FIG. 2. Note that while the retainer 32 holds the elements 11, 12 together, it does not interfere with the relative rotation between them, which rotation is provided by the bearing surfaces 28, 30, but resisted by the torque limiting elements 15, 19.

Depending upon the particular materials of construction and the particular geometric design of the elements 15, 19, as the elements 15, 19 move with respect to each other to return to the rest position after the maximum torque has been exceeded (see FIG. 6) there may be an audible snapping sound, and/or a clearly noticeable tactile sensation.

In a typical manner of construction and use of the applicator 10 according to the invention, the element 12 is slipped into the open bottom of the element 11 so that the bearing surfaces 28, 30 engage. The retaining ring 32 is then passed through the bore 37 so that the pin 38 moves through the bore 34 in the ring 32. Then using a heated tool the pin 38 is engaged and the head 41 formed, holding the elements 11, 12 together so that they will not separate in the axial dimension. Then the appropriate plug 33, having indicia 45 indicating the maximum torque for the elements 15, 19, is pushed into the bore 47 so that an interference fit between the surfaces 47, 48 takes place.

The applicator 10 is then used to fasten a plurality of fasteners 21. For example assuming that the fastener 21 is a bone penetrating pin, the drive element 16 is moved into operative association with the fastener head 20 of the first fastener 21 (see FIG. 2), and the handle 14 is grasped by the operator and turned from the rest position of FIG. 3 in the direction 22, so that there is a force transmitting engagement between the surfaces 23, 24. Continued rotation of the handle 14 thus effects rotation of the drive element 16, resulting in rotation of the fastener head 20. Once the fastener 21 penetrates the bone sufficiently so that further torque should not be applied, the maximum torque level of the applicator 10 is reached, FIG. 5 illustrating the relative positions between the components 15, 19 at full stress (when the maximum torque is achieved). Then, as seen in FIG. 6, the elements 15 become sufficiently deformed so that they move past the "lobes" 25 of the cam element 19, an audible and tactile sensation being provided so that the user knows that the maximum torque has been reached, and so that the elements 15, 19 return to a rest position as seen in FIG. 6. Then the user simply removes the applicator 10 from the head 20, and moves the drive element 16 into association with another head 20 of another fastener 21, the process being repeated until all appropriate fasteners 21 have been installed.

The applicator 10 according to the present invention can be produced inexpensively enough so that it is disposable after the installation of one set of fasteners 21. However it may be made of more secure materials so that it is essentially a permanent structure, being continuously reusable. Also it can be made of materials that are sterilizable, so that when subjected to steam and EtO or gamma radiation the physical properties do not change sufficiently enough so that the device 10 could not be reused (e.g. for another patient or environment).

It will thus been seen that according to the present invention a simple, effective, reusable yet low cost torque limited applicator is provided, as well as a method of utilization thereof. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices and procedures.

What is claimed is:

1. A torque limited applicator comprising:
    a torque applying element having a tubular body and a handle, said tubular body comprising at least two internal deformable cam followers;
    a fastener drive structure having first and second ends, and comprising a drive element adjacent said first end, and a cam element adjacent said second end; and
    said cam followers and said cam element engaging and cooperating with each other so that upon application of a force to said handle up to a predetermined maximum torque said cam followers engage said cam element to transmit rotational force from said handle to said drive element, and upon said predetermined maximum torque being exceeded said cam followers are deformed and moved past said cam element so that a torque greater than said predetermined maximum cannot be applied to said drive element by said torque applying element.

2. A torque limited applicator as recited in claim 1 wherein said cam element comprises a cylindrical element having a cross-section in the shape of a pointed end ellipse.

3. A torque limited applicator as recited in claim 2 wherein said tubular body of said torque applicator has an interior surface; and wherein said cam followers comprise at least two oppositely disposed first and second arms of bendable material and each having a contoured surface free end extending outwardly from said interior surface and engaging said cam element; and wherein there is sufficient clearance within said tubular body of said torque applying element between said cam element and said contoured surface free ends so that said free ends may move between said cam element and said tubular body interior along substantially 360°.

4. A torque limited applicator as recited in claim 3 wherein said torque applying element and fastener drive structure are each one integral piece of plastic.

5. A torque limited applicator as recited in claim 4 further comprising a retaining ring for connecting said torque applying element and fastener drive structure together so that they are connected during normal use.

6. A torque limited applicator as recited in claim 5 further comprising a plug that plugs said torque applying element tubular body at said handle.

7. A torque limited applicator as recited in claim 6 wherein said plug has indicia thereon, visible from the exterior of said torque applying element, indicating the predetermined maximum torque that can be applied by said torque applying element.

8. A torque limited applicator as recited in claim 6 wherein said plug and said retaining ring are also each one integral piece of plastic.

9. A torque limited applicator as recited in claim 8 wherein said torque applying element, fastener drive element, plug, and retaining ring are all of the same plastic.

10. A torque limited applicator as recited in claim 9 wherein said plastic is acetal, polyamide, or polytetrafluoroethylene.

11. A torque limited applicator as recited in claim 1 wherein said cam element has at least two lobes.

12. A torque limited applicator as recited in claim 1 wherein said torque applying element is an integral piece of acetal, and said fastener drive structure is an integral piece of polytetrafluoroethylene.

13. A torque limited applicator as recited in claim 1 wherein said cam followers each have a top surface; and further comprising a retaining ring having a central opening therein, said retaining ring having a bottom surface in engagement with said top surface; and wherein said fastener drive structure includes a pin integral therewith and extending upwardly therefrom, said pin having cross-sectional dimensions less than the cross-sectional dimensions of said ring opening, and having a length greater than the thickness of said ring so that a portion of said pin extends above said ring; said portion of said pin above said ring deformed into contact with the top surface of said ring to hold said ring in place.

14. A torque limited applicator as recited in claim 1 further comprising bearing surfaces between said torque applying element and said fastener drive structure to facilitate relative rotation therebetween.

15. A method of securing a fastener in place, which fastener should be subjected to only a predetermined amount of torque, comprising the steps of:
    (a) selecting an appropriate torque level limited applicator comprising a torque applying element having a tubular body and a handle, said tubular body comprising at least two internal deformable cam followers;
        a fastener drive structure having first and second ends, and comprising a drive element adjacent said first end, and a cam element adjacent said second end; and said cam followers and said cam element engaging and cooperating with each other so that upon application of a force to said handle up to a predetermined maximum torque said cam followers engage said cam element to transmit rotational force from said handle to said drive element, and upon said predetermined maximum torque being exceeded said cam followers are deformed and moved past said cam element so that a torque greater than said predetermined maximum cannot be applied to said drive element by said torque applying element;

(b) bringing the drive element associated with the torque limited applicator into operative contact with a fastener;

(c) rotating the torque applying element to drive the fastener drive structure until the desired torque level has been reached as indicated by a tactile or audible indication once the cam followers have moved past the cam element;

(d) removing the torque limited applicator from the fastener; and (e) repeating steps (a) through (d) for a second fastener using the same torque limited applicator.

16. A method as recited in claim 15 wherein at least three torque limited applicators are provided, each of said applicators having a different maximum torque, and of a different color; and wherein step (a) is practiced by selecting the appropriate color of torque limiting applicator corresponding to the maximum torque required.

17. A torque limited applicator comprising:

a torque applying element having a body, a handle, and either at least two deformable cam followers or a cam element;

a fastener drive structure having a drive element and either a cam element or deformable cam followers; and one of said torque applying element and said fastener drive structure including deformable cam followers and the other including a cam element, said cam followers and cam element engaging and cooperating with each other so that upon application of a force to said handle up to a predetermined maximum torque said cam followers and said cam element cooperate to apply a rotational force from said handle to said drive element, and upon said predetermined maximum torque being exceeded said cam followers are deformed and relative movement between said cam element and said cam followers takes place so that a torque greater than said predetermined maximum cannot be applied to said drive element by said torque applying element.

* * * * *